(12) United States Patent
Alex et al.

(10) Patent No.: US 11,852,711 B2
(45) Date of Patent: Dec. 26, 2023

(54) SYSTEMS AND METHODS FOR ULTRA-WIDEBAND RADIO

(71) Applicant: Meta Platforms Technologies, LLC, Menlo Park, CA (US)

(72) Inventors: Sam Padinjaremannil Alex, Dublin, CA (US); Nabeel Ahmed, San Jose, CA (US); Carlos Horacio Aldana, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/565,737

(22) Filed: Dec. 30, 2021

(65) Prior Publication Data

US 2022/0303819 A1    Sep. 22, 2022

Related U.S. Application Data

(60) Provisional application No. 63/163,409, filed on Mar. 19, 2021, provisional application No. 63/163,415, (Continued)

(51) Int. Cl.
*G01S 11/02* (2010.01)
*H04W 76/14* (2018.01)
(Continued)

(52) U.S. Cl.
CPC ............ *G01S 11/02* (2013.01); *H04L 69/22* (2013.01); *H04W 4/023* (2013.01); (Continued)

(58) Field of Classification Search
CPC ....... G01S 11/02; H04W 76/14; H04W 72/20; H04W 72/542; H04W 72/541; (Continued)

(56) References Cited

U.S. PATENT DOCUMENTS 10,064,038 B2    8/2018    Kulavik et al.
10,721,571 B2    7/2020    Crow et al.
(Continued)

FOREIGN PATENT DOCUMENTS

EP    1560344 A1 *    8/2005    ............. H04B 1/719
EP    2031418 A1      3/2009
(Continued)

OTHER PUBLICATIONS

Alanwar A., et al., "SeleCon: Scalable IoT Device Selection and Control Using Hand Gestures," IEEE/ACM Second International Conference on Internet-of-Things Design and Implementation (IoTDI), Apr. 18, 2017, pp. 47-58.
(Continued)

*Primary Examiner* — Ajay Cattungal
(74) *Attorney, Agent, or Firm* — Foley & Lardner LLP

(57) ABSTRACT

A device may include a first ultra-wideband (UWB) antenna and one or more processors. The one or more processors may be configured to establish a plurality of respective connections with a plurality of second devices each having a respective UWB antenna. The device may identify an interference condition for at least one of the plurality of connections. The device may update a configuration for traffic sent via the at least one of the plurality of connections according to the identified interference condition, and can transmit a first packet to one of the plurality of second devices according to the updated configuration.

20 Claims, 9 Drawing Sheets

Related U.S. Application Data filed on Mar. 19, 2021, provisional application No. 63/163,418, filed on Mar. 19, 2021, provisional application No. 63/163,403, filed on Mar. 19, 2021.

(51) Int. Cl.
| | | |
|---|---|---|
| *H04W 4/02* | (2018.01) | |
| *H04L 69/22* | (2022.01) | |
| *H04W 28/02* | (2009.01) | |
| *H04W 28/22* | (2009.01) | |
| *H04W 72/044* | (2023.01) | |
| *H04W 72/20* | (2023.01) | |
| *H04W 72/541* | (2023.01) | |
| *H04W 72/542* | (2023.01) | |

(52) U.S. Cl.
CPC ... *H04W 28/0236* (2013.01); *H04W 28/0247* (2013.01); *H04W 28/22* (2013.01); *H04W 72/0473* (2013.01); *H04W 72/20* (2023.01); *H04W 72/541* (2023.01); *H04W 72/542* (2023.01); *H04W 76/14* (2018.02)

(58) Field of Classification Search
CPC ............. H04W 4/023; H04W 28/0236; H04W 28/0247; H04W 28/22; H04W 72/0473; H04L 69/22

See application file for complete search history.

(56) References Cited

U.S. PATENT DOCUMENTS

| | | | |
|---|---|---|---|
| 11,470,444 B2 | 10/2022 | Burowski et al. | |
| 11,516,337 B2 | 11/2022 | Ledvina et al. | |
| 11,588,722 B2* | 2/2023 | Costa-Requena | ..... H04W 24/02 |
| 2004/0028011 A1 | 2/2004 | Gehring et al. | |
| 2004/0156512 A1 | 8/2004 | Parker | |
| 2005/0041746 A1 | 2/2005 | Rosen et al. | |
| 2006/0171445 A1* | 8/2006 | Batra | ................... H04W 52/243 |
| | | | 375/130 |
| 2007/0105501 A1* | 5/2007 | Shen | ................... H04W 52/243 |
| | | | 455/67.11 |
| 2007/0201393 A1* | 8/2007 | Srikrishna | ........... H04W 52/286 |
| | | | 370/318 |
| 2010/0272151 A1* | 10/2010 | Nandagopalan | ......... H04B 1/44 |
| | | | 375/132 |
| 2010/0273505 A1 | 10/2010 | Moller et al. | |
| 2014/0169162 A1* | 6/2014 | Romano | ............... A61B 5/0015 |
| | | | 370/230 |
| 2015/0180757 A1* | 6/2015 | Oshiba | ............. H04W 28/0236 |
| | | | 370/252 |
| 2016/0360497 A1* | 12/2016 | Maruyama | ......... H04N 21/6437 |
| 2020/0068308 A1 | 2/2020 | Hosoi et al. | |
| 2020/0313999 A1* | 10/2020 | Lee | ..................... H04L 43/0847 |
| 2020/0382158 A1 | 12/2020 | Yang et al. | |
| 2021/0014677 A1 | 1/2021 | Han et al. | |
| 2021/0072373 A1 | 3/2021 | Schoenberg et al. | |
| 2021/0160613 A1 | 5/2021 | Gigandet et al. | |
| 2021/0360366 A1 | 11/2021 | Bailey et al. | |
| 2022/0264251 A1 | 8/2022 | Wang et al. | |

FOREIGN PATENT DOCUMENTS

| | | |
|---|---|---|
| WO | 2015144293 A2 | 10/2015 |
| WO | 2020214708 A1 | 10/2020 |
| WO | 2021023377 A1 | 2/2021 |

OTHER PUBLICATIONS

"IEEE Standard for Low-Rate Wireless Networks—Amendment 1: Enhanced Ultra Wideband (UWB) Physical Layers (PHYs) and Associated Ranging Techniques; IEEE Std 802.15.4z-2020 (Amendment to IEEE Std 802.15.4-2020)," IEEE Standard, Aug. 25, 2020, XP068170639, DOI: 10.1109/IEEESTD.2020.9179124, Retrieved from the Internet: URL: https://ieeexplore.ieee.org/document/9179124, [retrieved on Aug. 31, 2020], 174 pages.

International Search Report and Written Opinion for International Application No. PCT/US2022/020233 dated Aug. 11, 2022, 19 pages.

International Search Report and Written Opinion for International Application No. PCT/US2022/020449 dated Jun. 21, 2022, 13 pages.

International Search Report and Written Opinion for International Application No. PCT/US2022/020563, dated Jul. 8, 2022, 12 pages.

International Search Report and Written Opinion for International Application No. PCT/US2022/020630, dated Aug. 10, 2022, 16 pages.

* cited by examiner

SYSTEMS AND METHODS FOR ULTRA-WIDEBAND RADIO

CROSS-REFERENCE TO RELATED APPLICATION

This application claims priority to and the benefit of U.S. Provisional Application No. 63/163,418, filed Mar. 19, 2021, U.S. Provisional Application No. 63/163,415, filed Mar. 19, 2021, U.S. Provisional Application No. 63/163,409, filed Mar. 19, 2021, and U.S. Provisional Application No. 63/163,403, filed Mar. 19, 2021, each of which is incorporated herein by reference in its entirety for all purposes.

FIELD OF DISCLOSURE

The present disclosure is generally related to communications, including but not limited to systems and methods for ultra-wideband radio.

BACKGROUND

Artificial reality such as virtual reality (VR), augmented reality (AR), or mixed reality (MR) provides immersive experience to a user. Typically, in systems and methods which implement or otherwise provide immersive experiences, such systems utilize Wi-Fi, Bluetooth, or Radio wireless links to transmit/receive data. However, using such wireless links typically requires detailed coordination between links, particularly where multiple devices in the same environment are utilizing the same wireless link technology for communications.

SUMMARY

In one aspect, disclosed herein are related to a device. The device may include a first ultra-wideband (UWB) antenna and one or more processors. The one or more processors may be configured to establish a plurality of respective connections with a plurality of second devices each having a respective UWB antenna. The one or more processors may be configured to identify an interference condition for at least one of the plurality of connections. The one or more processors may be configured to update a configuration for traffic sent via the at least one of the plurality of connections according to the identified interference condition, and to transmit a first packet to one of the plurality of second devices according to the updated configuration.

In some embodiments, the one or more processors may be configured to select at least one of a power transmission level or a waveform format for the traffic sent via the plurality of respective transmission responsive to the identified interference condition. The one or more processors may be configured to transmit the first packet using the selected power transmission level or the selected waveform format. The one or more processors may be configured to determine a traffic type of data included in the packet. The one or more processors may be configured to select the at least one of the power transmission level or the waveform format according to the traffic type and the identified interference condition.

In some embodiments, to update the configuration, the one or more processors may be configured to select a data processing scheme corresponding to a packet size for the packet, responsive to the identified interference condition, and generate the packet according to the data processing scheme. The one or more processors may be further configured to encode the packet according to the data processing scheme. The one or more processors may be further configured to select the data processing scheme from a first data processing scheme and a second data processing scheme. The first data processing scheme may cause the first device to generate packets having a first data size and the second data processing scheme may cause the first device to generate packets having a second data size.

In some embodiments, the plurality of second devices may include a second device and a third device. The one or more processors may be further configured to generate a link servicing schedule for the plurality of second devices. The link servicing schedule may include a first slot for exchanging first data with the second device and a second slot for exchanging second data with the third device. The one or more processors may be configured to receive a second packet for transmission to the second device outside of the first slot, determine that the second packet includes asynchronous data and transmit the second packet to the second device outside of the first slot.

In some embodiments, the one or more processors are further configured to identify, for a first connection of the plurality of connections, one or more metrics for the first connection, and determine to switch from a first frequency for the first connection to a second frequency for the first connection responsive to the one or more metrics satisfying a threshold criteria.

In some embodiments, the one or more metrics may include a number of packets lost, a rate of packet errors, a busy time for the first connection, a number of current beacons on the first connection, or a number of unique beacons on the first connection.

In another aspect, disclosed herein are related to a method. The method may include establishing, by a first device including a first ultra-wideband (UWB) antenna, a plurality of respective connections with a plurality of second devices each having a respective UWB antenna. The method may include identifying, by the first device, an interference condition for at least one of the plurality of connections. The method may include updating, by the first device, a configuration for traffic sent via the at least one of the plurality of connections according to the identified interference condition. The method may include transmitting, by the first device, a packet to one of the plurality of second devices according to the updated configuration.

In another aspect, disclosed herein are related to a non-transitory computer readable medium storing instructions that, when executed by one or more processors, may cause the one or more processors to establish a plurality of respective connections between a first device comprising a first ultra-wideband (UWB) antenna and a plurality of second devices each having a respective UWB antenna. The one or more processors may identify an interference condition for at least one of the plurality of connections, update a configuration for traffic sent via the at least one of the plurality of connections according to the identified interference condition, and transmit a first packet to one of the plurality of second devices according to the updated configuration.

In one aspect, the present systems and methods are directed to low latency optimization through dynamic selection of data processing schemes. The present systems and methods may select or switch between data processing schemes based on a detected or determined environment in which data is to be transmitted. The present systems and methods may switch between a first data processing scheme which results in low power consumption and a second data processing scheme which decreases the impact of interference.

In another aspect, the present systems and methods are directed to latency sensitive traffic scheduling. The present systems and methods may be configured to identify latency sensitive (e.g., asynchronous) traffic which is to be transmitted to a receiver in an environment. The present systems and methods may be configured to automatically override a link servicing schedule in which receivers are scheduled to receive traffic via the respective links, to transmit the asynchronous data to the receiver.

In still another aspect, the present systems and methods are directed to transmission power control of data transmissions to a receiver. The systems and methods described herein may be configured to determine a traffic type of traffic to be sent to a receiver. The systems and methods described herein may be configured to control a power of the data transmissions based on the traffic type.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
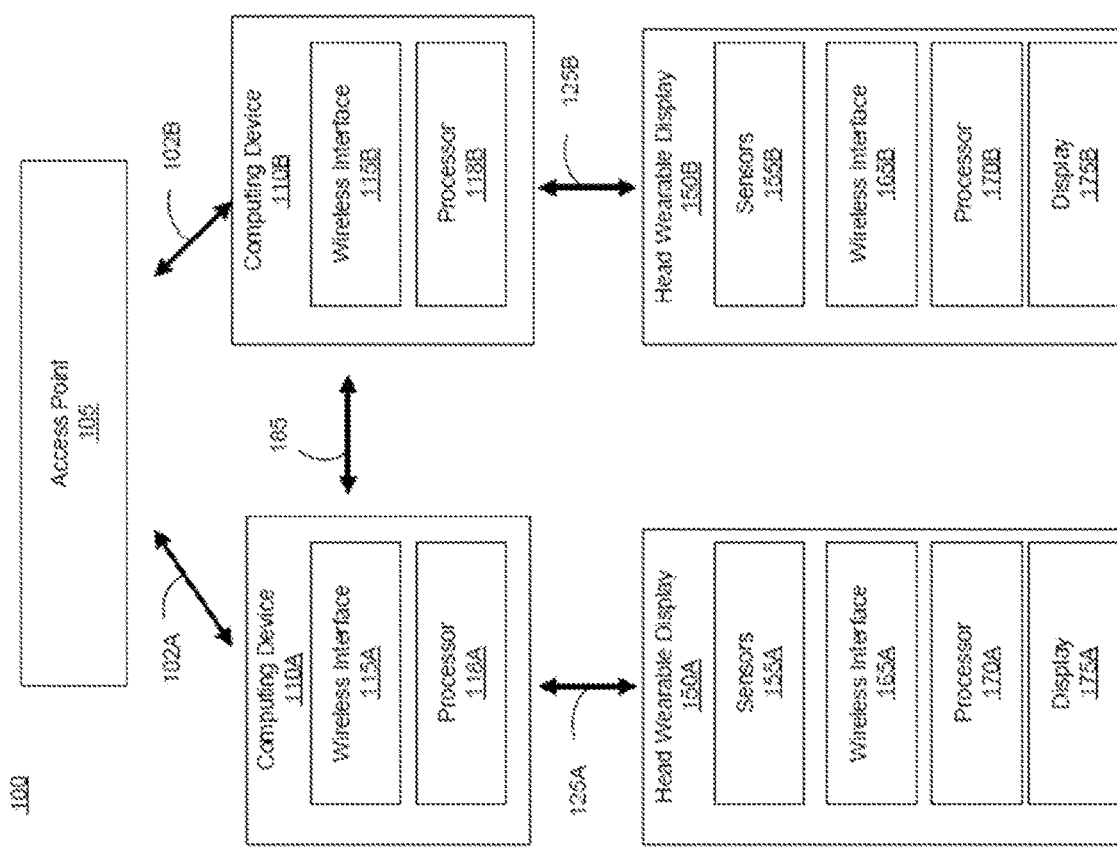
FIG. 1 is a diagram of a system environment including an artificial reality system, according to an example implementation of the present disclosure.
Figure 2:
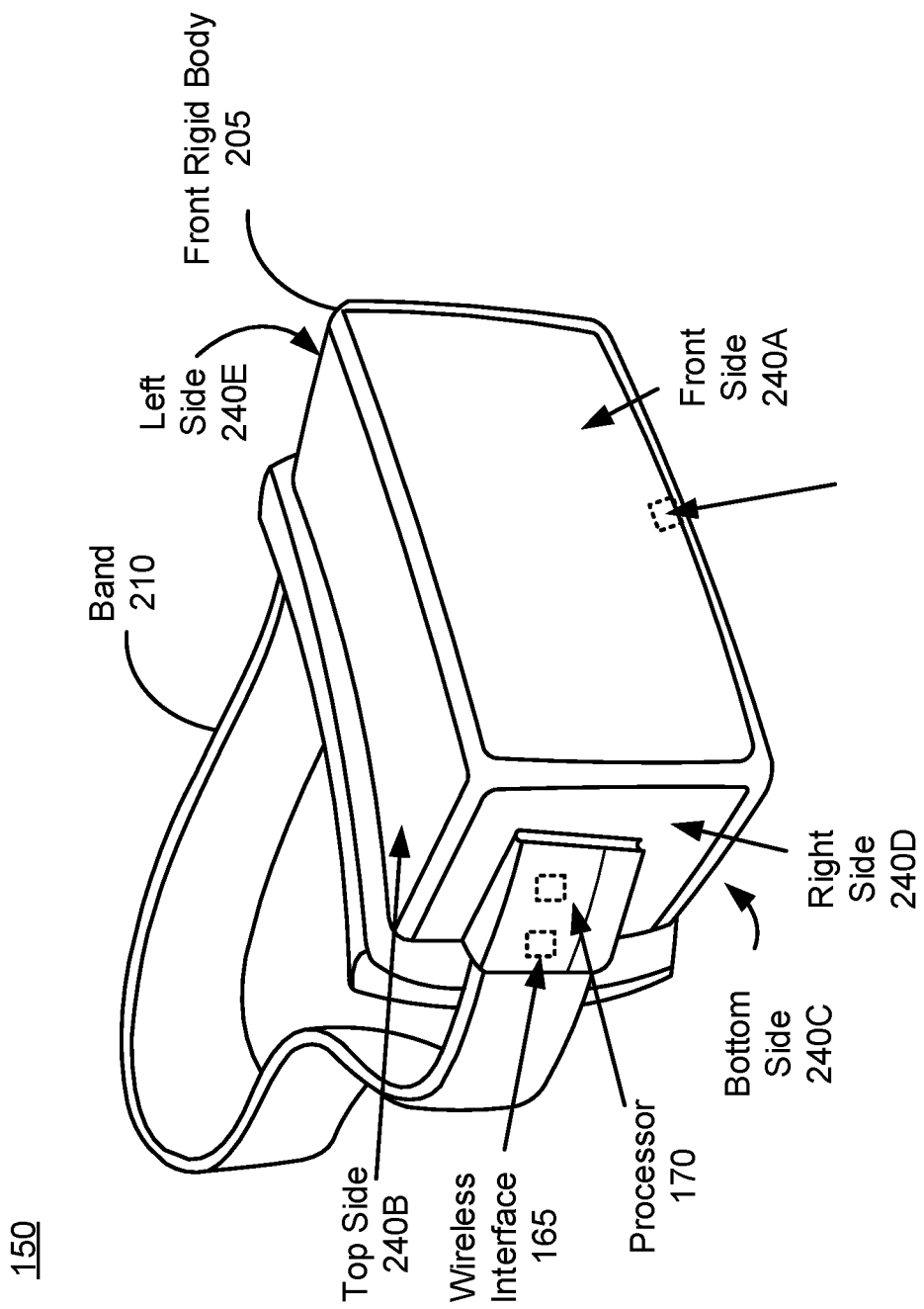
FIG. 2 is a diagram of a head wearable display, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to devices operating in the ultra-wideband (UWB) spectrum. In various embodiments, UWB devices operate in the 3-10 GHz unlicensed spectrum using 500+ MHz channels which may require low power for transmission. For example, the transmit power spectral density (PSD) for some devices may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices within a shared or common environment) for very low data rates (e.g., 10 s to 100 s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Some implementations of UWB may focus on precision ranging, security, and low to moderate rate data communication. As UWB employs relatively simple modulation, it may be implemented at low cost and low power consumption. In AR/VR applications, link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions. Using conservative body loss assumptions, the systems and methods described herein should be configured for data throughput of up to approximately 5 Mbps, which may be sufficient to meet the data throughput performance standards for AR/VR links. With a customized implementation, data throughput rate could be increased beyond 27 Mbps (e.g., to 54 Mbps), but with possible loss in link margin.

The systems and methods described herein may be used or leveraged in various AR/VR use cases and applications. The systems and methods described herein may be used for data communication and ranging within AR/VR products, as well as seamless communication within an ecosystem or environment of devices or components. For example, the systems and methods described herein may be used for secure transfer of user context between devices (e.g., audio/video calls, live video chat sessions, etc.), synchronization of data between devices (e.g., contact list, to-do list, photos, etc.), synchronization of health data between devices for sports applications (e.g., health statistics from a wearable device sent to a video capture and communication device), transfer of telemetry and inertial measurement unit data for offline analysis (e.g., for use in various artificial intelligence applications to make recommendations, such as places to go, for a more personalized experience), and interoperability applications between devices (e.g., using a wearable device or video capture device remote as an "air" mouse to communicate with other devices, such as a head-wearable device (HWD)). The systems and methods described herein may leverage UWB for such communication and synchronization, which may result in low power, cost, and latency, increased security by way of enhanced precision ranging (including distance and angle determination), capability of high data throughput in low tens of Mbps, and may be resistant to interference with other wireless links (such as those provided by Wi-Fi and Bluetooth).

Additional applications and use cases for the present systems and methods may include use cases relating to AR/VR devices, use cases relating to video capture devices, internet-of-things (IoT) or smart devices, headphones, and the like. For example, with respect to AR/VR devices, the systems and methods described herein may incorporate UWB devices (in place of Wi-Fi, radio frequency, or Bluetooth device(s)), which may be used for data communication for both link data transfer and inertial measurement unit data transfer. In such implementations, the AR/VR devices may have an increased data throughput rate on a per-controller basis, as well as increased data throughput rates for broadcast data (such as broadcasted map data). Additionally, the AR/VR devices may resolve any co-existence problems relating to radio frequency, Bluetooth (and Bluetooth low energy), Wi-Fi, and Bluetooth headphones. Furthermore, the AR/VR devices may have low latency in comparison to other implementations and embodiments, and may be less costly by eliminating hardware (such as Wi-Fi chips) from the AR/VR controller. As another example, with respect to use cases relating to video capture devices, the systems and methods described herein may include UWB devices for ranging and data communication for a remote control in communication with the video capture device. Such implementations and embodiments may provide for two-way ranging (TWR) for distance and angle of approach (AOA) determination, may provide for determining whether the remote control is located "in-room" for securely controlling a video capture device, and may add distance to the operable range of the remote control for an improved air mouse. With respect to Internet-of-Things (IoT) or smart devices, the systems and methods described herein may include UWB devices for implementing a digital key (e.g., for a home or automobile). Such implementations and embodiments may provide for automatic unlocking a home or automobile (e.g., via secure link) as a user approaches. With respect to headphones, the systems and methods described herein may include UWB devices for VR/Smart glasses, wearable devices, custom headphones, video capture devices to decrease latency in audio communications. Various applications, use cases, and further implementations of the systems and methods described herein are described in greater detail below.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as consoles) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. In some embodiments, the wireless link 125 may include one or more ultra-wideband communication links, as described in greater detail below. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, ultra-wideband link, or any wireless communication link. The wireless interface 115 may also include a component to communicate with a different computing device 110 through a wireless link 185. Examples of the wireless link 185 include a near field communication link, Wi-Fi direct, Bluetooth, ultra-wideband link, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

Systems and Methods for Ultra-Wideband Devices

In various embodiments, the devices in the environments described above may operate or otherwise use components which leverage communications in the ultra-wideband (UWB) spectrum. In various embodiments, UWB devices operate in the 3-10 GHz unlicensed spectrum using 500+ MHz channels which may require low power for transmission. For example, the transmit power spectral density (PSD) for some systems may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices located in the environment) for very low data rates (e.g., 10 s to 100 s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Figure 3:
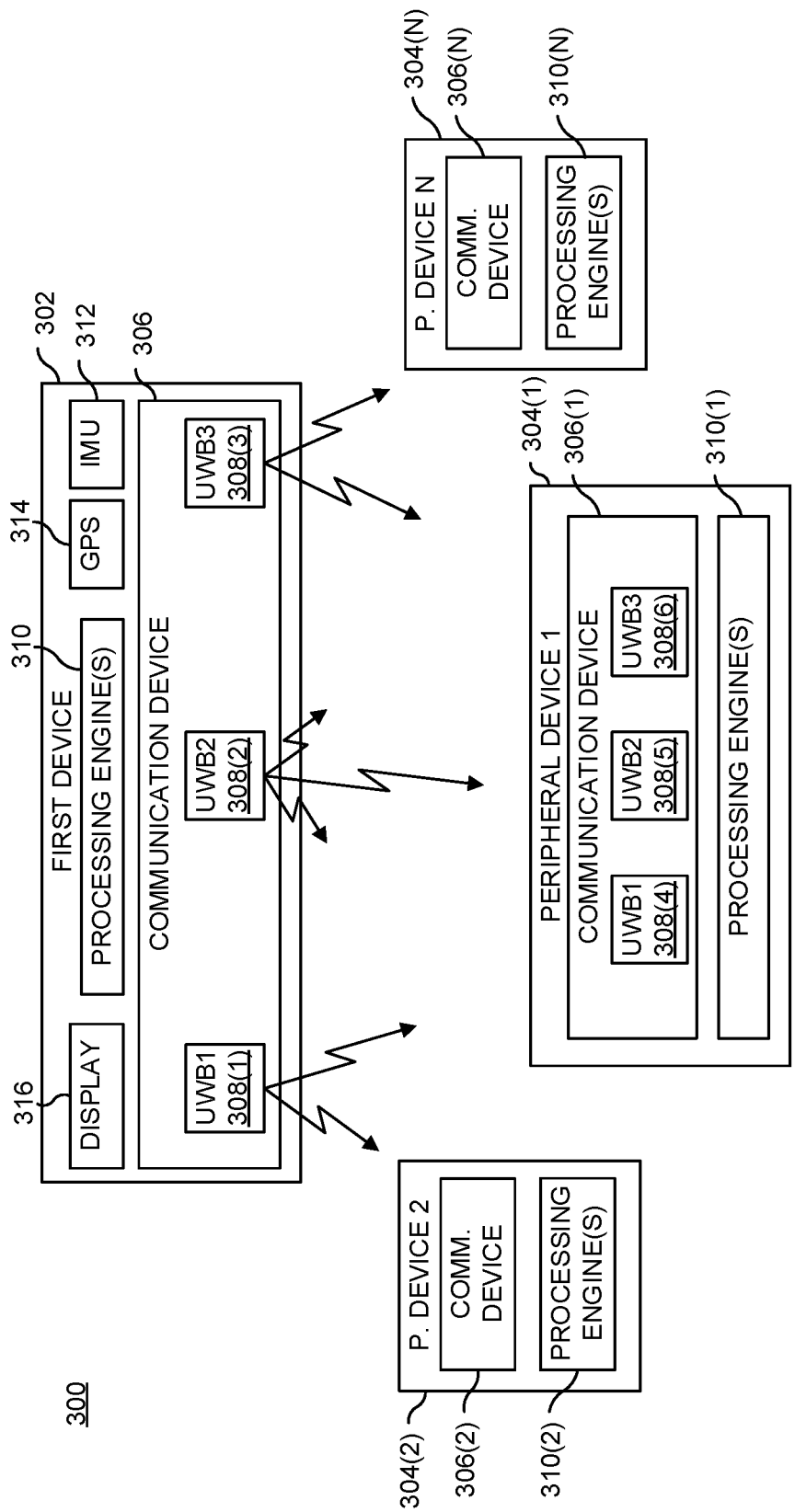
FIG. 3 is a block diagram of an artificial reality environment, according to an example implementation of the present disclosure.

Some implementations of UWB may focus on precision ranging, security, and for low-to-moderate rate data communication. As UWB employs relatively simple modulation, it may be implemented at low cost and low power consumption. In AR/VR applications (or in other applications and use cases), link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions Referring now to FIG. 3, depicted is a block diagram of an artificial reality environment 300. The artificial reality environment 300 is shown to include a first device 302 and one or more peripheral devices 304(1)-304(N) (also referred to as "peripheral device 304" or "device 304"). The first device 302 and peripheral device(s) 304 may each include a communication device 306 including a plurality of UWB devices 308. A set of UWB devices 308 may be spatially positioned/located (e.g., spaced out) relative to each other on different locations on/in the first device 302 or the peripheral device 304, so as to maximize UWB coverage and/or to enhance/enable specific functionalities. The UWB devices 308 may be or include antennas, sensors, or other devices and components designed or implemented to transmit and receive data or signals in the UWB spectrum (e.g., between 3.1 GHz and 10.6 GHz) and/or using UWB communication protocol. In some embodiments, one or more of the devices 302, 304 may include various processing engines 310. The processing engines 310 may be or include any device, component, machine, or other combination of hardware and software designed or implemented to control the devices 302, 304 based on UWB signals transmitted and/or received by the respective UWB devices 308.

As noted above, the environment 300 may include a first device 302. The first device 302 may be or include a wearable device, such as the HWD 150 described above, a smart watch, AR glasses, or the like. In some embodiments, the first device 302 may include a mobile device (e.g., a smart phone, tablet, console device, or other computing device). The first device 302 may be communicably coupled with various other devices 304 located in the environment 300. For example, the first device 302 may be communicably coupled to one or more of the peripheral devices 304 located in the environment 300. The peripheral devices 304 may be or include the computing device 110 described above, a device similar to the first device 302 (e.g., a HWD 150, a smart watch, mobile device, etc.), an automobile or other vehicle, a beacon transmitting device located in the environment 300, a smart home device (e.g., a smart television, a digital assistant device, a smart speaker, etc.), a smart tag configured for positioning on various devices, etc. In some embodiments, the first device 302 may be associated with a first entity or user and the peripheral devices 304 may be associated with a second entity or user (e.g., a separate member of a household, or a person/entity unrelated to the first entity).

In some embodiments, the first device 302 may be communicably coupled with the peripheral device(s) 304 following a pairing or handshaking process. For example, the first device 302 may be configured to exchange handshake packet(s) with the peripheral device(s) 304, to pair (e.g., establish a specific or dedicated connection or link between)

the first device 302 and the peripheral device 304. The handshake packet(s) may be exchanged via the UWB devices 308, or via another wireless link 125 (such as one or more of the wireless links 125 described above). Following pairing, the first device 302 and peripheral device(s) 304 may be configured to transmit, receive, or otherwise exchange UWB data or UWB signals using the respective UWB devices 308 on the first device 302 and/or peripheral device 304. In some embodiments, the first device 302 may be configured to establish a communications link with a peripheral device 304 (e.g., without any device pairing). For example, the first device 302 may be configured to detect, monitor, and/or identify peripheral devices 304 located in the environment using UWB signals received from the peripheral devices 304 within a certain distance of the first device 302, by identifying peripheral devices 304 which are connected to a shared Wi-Fi network (e.g., the same Wi-Fi network to which the first device 302 is connected), etc. In these and other embodiments, the first device 302 may be configured to transmit, send, receive, or otherwise exchange UWB data or signals with the peripheral device 304.

Figure 4:
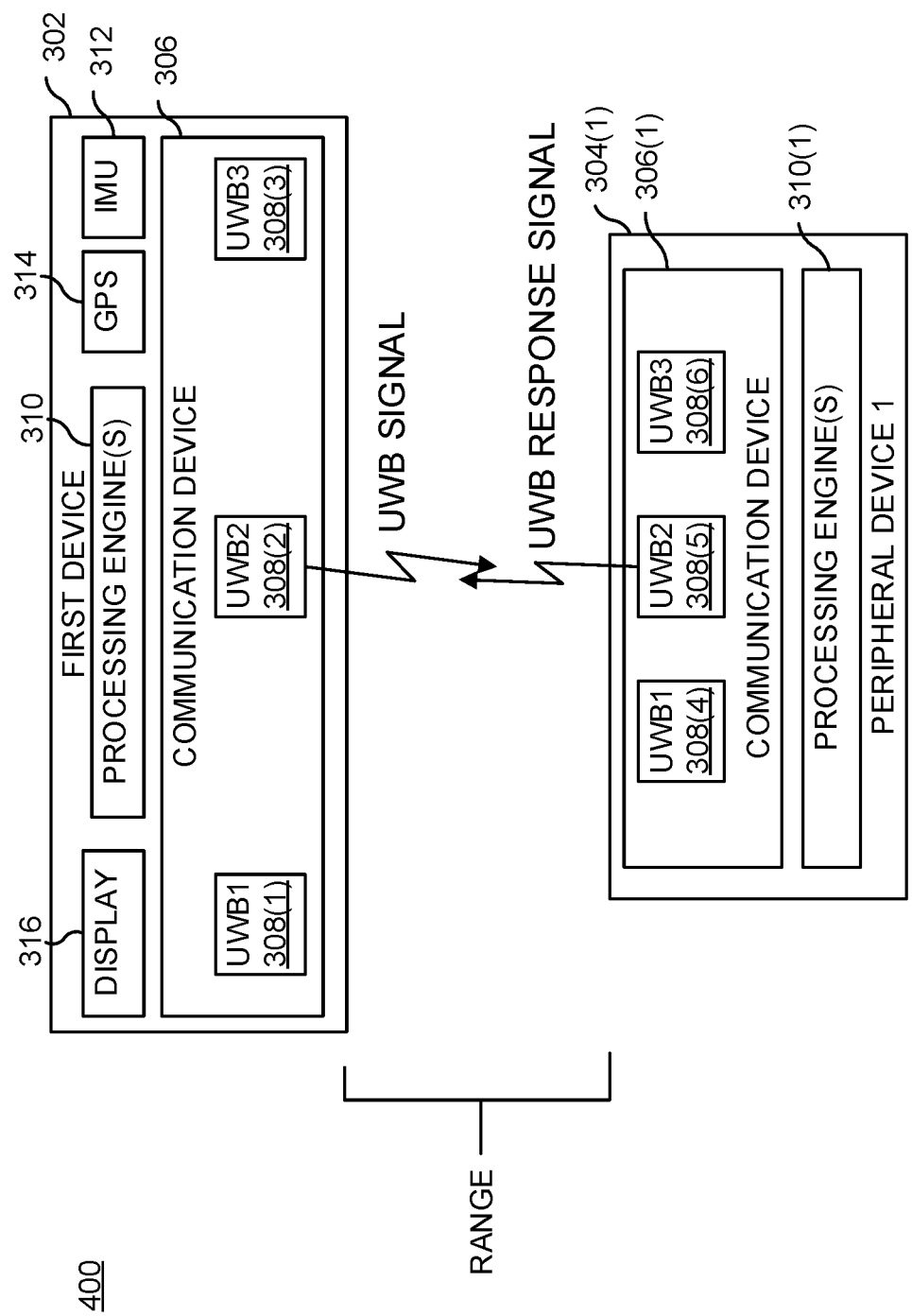
FIG. 4 is a block diagram of another artificial reality environment, according to an example implementation of the present disclosure.

Referring now to FIG. 4, depicted is a block diagram of an environment 400 including the first device 302 and a peripheral device 304. The first device 302 and/or the peripheral device 304 may be configured to determine a range (e.g., a spatial distance, separation) between the devices 302, 304. The first device 302 may be configured to send, broadcast, or otherwise transmit a UWB signal (e.g., a challenge signal). The first device 302 may transmit the UWB signal using one of the UWB devices 308 of the communication device 306 on the first device 302. The UWB device 308 may transmit the UWB signal in the UWB spectrum. The UWB signal may have a high bandwidth (e.g., 500 MHz). As such, the UWB device 308 may be configured to transmit the UWB signal in the UWB spectrum (e.g., between 3.1 GHz and 10.6 GHz) and having a high bandwidth (e.g., 500 MHz). The UWB signal from the first device 302 may be detectable by other devices within a certain range of the first device 302 (e.g., devices having a line of sight (LOS) within 200 m of the first device 302). As such, the UWB signal may be more accurate for detecting range between devices than other types of signals or ranging technology.

The peripheral device 304 may be configured to receive or otherwise detect the UWB signal from the first device 302. The peripheral device 304 may be configured to receive the UWB signal from the first device 302 via one of the UWB devices 308 on the peripheral device 304. The peripheral device 304 may be configured to broadcast, send, or otherwise transmit a UWB response signal responsive to detecting the UWB signal from the first device 302. The peripheral device 304 may be configured to transmit the UWB response signal using one of the UWB devices 308 of the communication device 306 on the peripheral device 304. The UWB response signal may be similar to the UWB signal sent from the first device 302.

The first device 302 may be configured to detect, compute, calculate, or otherwise determine a time of flight (TOF) based on the UWB signal and the UWB response signal. The TOF may be a time or duration between a time in which a signal (e.g., the UWB signal) is transmitted by the first device 302 and a time in which the signal is received by the peripheral device 304. The first device 302 and/or the peripheral device 304 may be configured to determine the TOF based on timestamps corresponding to the UWB signal. For example, the first device 302 and/or peripheral device 304 may be configured to exchange transmit and receive timestamps based on when the first device 302 transmits the UWB signal (a first TX timestamp), when the peripheral device receives the UWB signal (e.g., a first RX timestamp), when the peripheral device sends the UWB response signal (e.g., a second TX timestamp), and when the first device 302 receives the UWB response signal (e.g., a second RX timestamp). The first device 302 and/or the peripheral device 304 may be configured to determine the TOF based on a first time in which the first device 302 sent the UWB signal and a second time in which the first device 302 received the UWB response signal (e.g., from the peripheral device 304), as indicated by first and second TX and RX timestamps identified above. The first device 302 may be configured to determine or calculate the TOF between the first device 302 and the peripheral device 304 based on a difference between the first time and the second time (e.g., divided by two).

In some embodiments, the first device 302 may be configured to determine the range (or distance) between the first device 302 and the peripheral device 304 based on the TOF. For example, the first device 302 may be configured to compute the range or distance between the first device 302 and the peripheral device 304 by multiplying the TOF and the speed of light (e.g., TOF×c). In some embodiments, the peripheral device 304 (or another device in the environment 400) may be configured to compute the range or distance between the first device 302 and peripheral device 304. For example, the first device 302 may be configured to transmit, send, or otherwise provide the TOF to the peripheral device 304 (or other device), and the peripheral device 304 (or other device) may be configured to compute the range between the first device 302 and peripheral device 304 based on the TOF, as described above.

Figure 5:
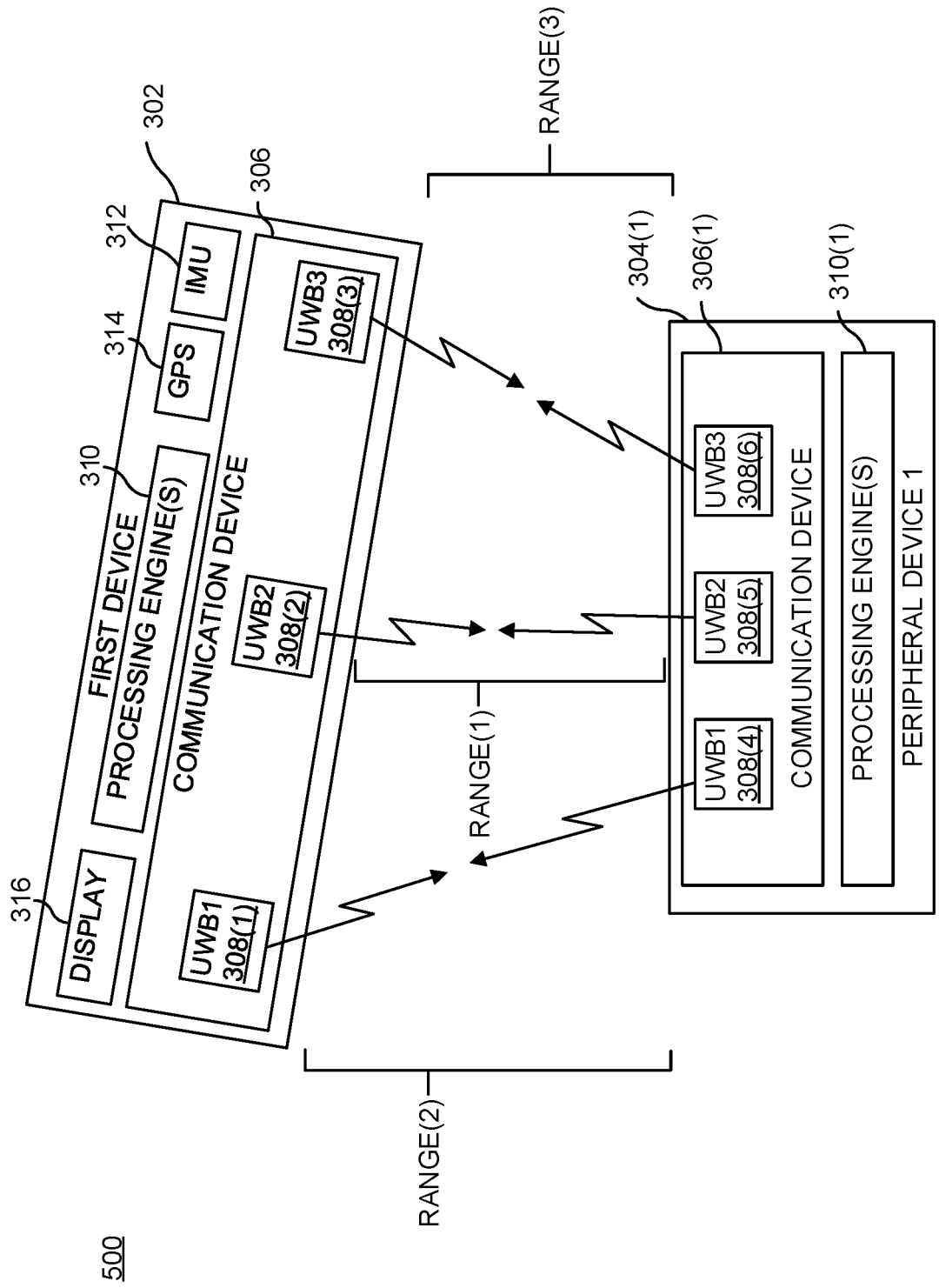
FIG. 5 is a block diagram of another artificial reality environment, according to an example implementation of the present disclosure.

Referring now to FIG. 5, depicted is a block diagram of an environment 500 including the first device 302 and a peripheral device 304. In some embodiments, the first device 302 and/or the peripheral device 304 may be configured to determine a position or pose (e.g., orientation) of the first device 302 relative to the peripheral device 304. The first device 302 and/or the peripheral device 304 may be configured to determine the relative position or orientation in a manner similar to determining the range as described above. For example, the first device 302 and/or the peripheral device 304 may be configured to determine a plurality of ranges (e.g., range(1), range(2), and range(3)) between the respective UWB devices 308 of the first device 302 and the peripheral device 304. In the environment 500 of FIG. 5, the first device 302 is positioned or oriented at an angle relative to the peripheral device 304. The first device 302 may be configured to compute the first range (range(1)) between central UWB devices 308(2), 308(5) of the first and peripheral device 304. The first range may be an absolute range or distance between the devices 302, 304, and may be computed as described above with respect to FIG. 4.

The first device 302 and/or the peripheral device 304 may be configured to compute the second range(2) and third range(3) similar to computing the range(1), In some embodiments, the first device 302 and/or the peripheral device 304 may be configured to determine additional ranges, such as a range between UWB device 308(1) of the first device 302 and UWB device 308(5) of the peripheral device 304, a range between UWB device 308(2) of the first device 302 and UWB device 308(6) of the peripheral device 304, and so forth. While described above as determining a range based on additional UWB signals, it is noted that, in some embodiments, the first device 302 and/or the peripheral device 304 may be configured to determine a phase difference between a UWB signal received at a first UWB device 308 and a second UWB device 308 (i.e., the same UWB signal received at separate UWB devices 308 on the same device 302, 304). The first device 302 and/or the peripheral device 304 may be configured to use each or a subset of the computed ranges (or phase differences) to determine the pose, position, orientation, etc. of the first device 302 relative to the peripheral device 304. For example, the first device and/or the peripheral device 304 may be configured to use one of the ranges relative to the first range(1) (or phase differences) to determine a yaw of the first device 302 relative to the peripheral device 304, another one of the ranges relative to the first range(1) (or phase differences) to determine a pitch of the first device 302 relative to the peripheral device 304, another one of the ranges relative to the first range(1) (or phase differences) to determine a roll of the first device 302 relative to the peripheral device 304, and so forth.

By using the UWB devices 308 at the first device 302 and peripheral devices 304, the range and pose may be determined with greater accuracy than other ranging/wireless link technologies. For example, the range may be determined within a granularity or range of +/−0.1 meters, and the pose/orientation may be determined within a granularity or range of +/−5 degrees.

Referring to FIG. 3-FIG. 5, in some embodiments, the first device 302 may include various sensors and/or sensing systems. For example, the first device 302 may include an inertial measurement unit (IMU) sensor 312, global positioning system (GPS) 314, etc. The sensors and/or sensing systems, such as the IMU sensor 312 and/or GPS 314 may be configured to generate data corresponding to the first device 302. For example, the IMU sensor 312 may be configured to generate data corresponding to an absolute position and/or pose of the first device 302. Similarly, the GPS 314 may be configured to generate data corresponding to an absolute location/position of the first device 302. The data from the IMU sensor 312 and/or GPS 314 may be used in conjunction with the ranging/position data determined via the UWB devices 308 as described above. In some embodiments, the first device 302 may include a display 316. The display 316 may be integrated or otherwise incorporated in the first device 302. In some embodiments, the display 316 may be separate or remote from the first device 302. The display 316 may be configured to display, render, or otherwise provide visual information to a user or wearer of the first device 302, which may be rendered at least in part on the ranging/position data of the first device 302.

One or more of the devices 302, 304 may include various processing engine(s) 310. As noted above, the processing engine(s) 310 may be or include any device, component, machine, or combination of hardware and software designed or implemented to control the devices 302, 304 based on UWB signals transmitted and/or received by the respective UWB devices 308. In some embodiments, the processing engine(s) 310 may be configured to compute or otherwise determine the ranges/positions of the first device 302 relative to the peripheral devices 304 as described above. In some embodiments, the processing engines 310 may be located or embodied on another device in the environment 300-500 (such as at the access point 105 as described above with respect to FIG. 1). As such, the first device 302 and/or peripheral devices 304 may be configured to off-load computation to another device in the environment 300-500 (such as the access point 105). In some embodiments, the processing engines 310 may be configured to perform various functions and computations relating to radio transmissions and scheduling (e.g., via the UWB devices 308 and/or other communication interface components), compute or otherwise determine range and relative position of the devices 302, 304, manage data exchanged between the devices 302, 304, interface with external components (such as hardware components in the environment 300-500, external software or applications, etc.), and the like. Various examples of functions and computations which may be performed by the processing engine(s) 310 are described in greater detail below.

Systems and Methods for UWB Radio

In some embodiments, the processing engine(s) 310 may include a radio engine. The radio engine may be or include any device, component, machine, or combination of hardware and software designed or implemented to control scheduling and transfer of data between the first device 302 and the peripheral device(s) 304. As described in greater detail below, the radio engine may be configured to perform link optimization and/or data transfer scheduling, switching between UWB devices 308, improve UWB link performance, and/or other functions relating to the UWB link between the first device 302 and peripheral device(s) 304.

Low Latency Optimization, with Interference and Power Consumption Tradeoff

In one aspect, the present systems and methods are directed to low latency optimization through dynamic selection of data processing schemes. The present systems and methods may select or switch between data processing schemes based on a detected or determined environment in which data is to be transmitted. The present systems and methods may switch between a first data processing scheme which results in low power consumption and a second data processing scheme which decreases the likelihood/impact of interference.

In some embodiments, the radio engine may be configured to perform low latency optimization of the UWB link between the first device 302 and peripheral device 304. As noted above, the first device 302 and peripheral device 304 may each include respective UWB devices 308. The first device 302 and peripheral device 304 may transmit, receive, or otherwise exchange data via the UWB devices 308. The first device 302 and peripheral device 304 may be configured to transmit data in the UWB spectrum as described above. In other implementations, such as where two devices communicate via another wireless link (e.g., Wi-Fi), such devices may perform link coordination with other devices located in the area to ensure that a channel to be used is not currently in use (e.g., by performing a listen before talk (LBT) function).

In the present system, the radio engine of the first device 302 and/or peripheral device 304 may be configured to transmit, receive, or otherwise exchange communications in the UWB spectrum independently of other devices located in the area. As such, the radio engine of the first device 302 and/or peripheral device 304 may not be required to perform a LBT function, particularly because the power of such communications via the UWB devices 308 may be approximately −41.3 dBm/MHz, which is approximately 30 dB lower than other wireless links (such as Wi-Fi links). Rather, the first device 302 and peripheral device 304 may be configured to transmit data in the UWB spectrum using the UWB devices 308 in a given channel without first determining whether the particular channel is in use.

In some instances, the first device 302 and peripheral device 304 may be located in an environment with a plurality of other devices 302 which also operate in the UWB spectrum. In such implementations, the radio engine of the first device 302 and/or peripheral device 304 may be configured to determine that additional devices are located in the environment. The radio engine of the first device 302 and peripheral device 304 may be configured to automatically increase packet size and packet processing at the first device 302, to increase the data processing sequence or cycle at both the first device 302 and the peripheral device 304. For example, where the packet size is increased, more data may be transmitted during a single transmission between the first device 302 and the peripheral device 304. As such, the radio engine of the first device 302 and/or peripheral device 304 may be configured to dynamically switch between data processing schemes based on whether additional devices are located in the same environment. For example, where there is a low likelihood of interference (e.g., when the first device 302 an/or peripheral device 304 are located in an environment with few or no other devices which operate or leverage communications in the UWB spectrum), the radio engine of the first device 302 and/or peripheral device 304 may be configured to select a first data processing scheme where the first device 302 and peripheral device 304 do not perform a LBT function (e.g., the devices 302, 304 communicate independently of each other and other devices). On the other hand, where there is a greater likelihood of interference (e.g., when the first device 302 and peripheral device 304 are located in an environment which includes other devices which operate or leverage communications in the UWB spectrum), the radio engine of the first device 302 and/or peripheral device may select a second data processing scheme (e.g., a coding scheme, sequencing scheme, etc.) which automatically increases packet size and/or packet processing, to increase the data processing sequence as stated above. The first processing scheme may result in lower power consumption by the respective devices 302, 304, but may be more prone to (e.g., more susceptible to or impacted by) interference. On the other hand, the second processing scheme may result in longer transmissions, longer coding and/or longer sequences (e.g., repetitious or pseudo-repetitious transmissions, encoded or modified transmissions, etc.) which can withstand/overcome more interference (e.g., by correcting/compensating against interference), but may result in more power consumption by the respective devices 302, 304.

In some embodiments, the radio engine of the first device 302 and/or peripheral device 304 may be configured to encode communications for the second processing scheme. For example, the radio engine may encode communications by repeating data transmissions or packets with a different symbol or random symbol, such that the data transmissions are repeated (e.g., according to the chip rate of the transmitting device 302, 304) and configured to be re-assembled or re-combined by the receiving device (e.g., following noise filtering).

Latency Sensitive Traffic Scheduling for Ultra-Low Latency Applications

In yet another aspect, the present systems and methods are directed to latency sensitive traffic scheduling. The present systems and methods may be configured to identify latency sensitive (e.g., asynchronous) traffic which is to be transmitted to a receiver in an environment. The present systems and methods may be configured to automatically override a link servicing schedule in which receivers are scheduled to receive traffic via the respective links, to transmit the asynchronous data to the receiver.

Referring now to FIG. 3, in some instances, a plurality of peripheral devices 304 may be located in an environment of the first device 302. In this example, the first device 302 may be a computing device or controller similar to the computing device 110 described above, and each of the peripheral devices 304 may be HWDs similar to the HWD 150 described above. Each peripheral device 304 may have a dedicated link or channel with the first device 302 in which the peripheral device 304 receives communications or data packets from the first device 302. Additionally, each dedicated link may have a dedicated slot in a link servicing schedule (e.g., a weighted fair queueing (WFQ) schedule), such that communications or data for the first peripheral device 304(1) is sent during a first slot, communications or data for the second peripheral device 304(2) is sent during a second slot, etc.

For example, the first device 302 can generate a link servicing schedule for the plurality of peripheral devices 304. The link servicing schedule can include a first slot for exchanging first data with the first peripheral device 304(1) and a second slot for exchanging second data with the second peripheral device 304(2). The first device may receive a second packet for transmission to the first peripheral device 304(1) outside of the first slot, may determine that the second packet includes asynchronous data, and can transmit the second packet to the first peripheral device 304(1) outside of the first slot. Asynchronous data may be data transmitted using asynchronous protocols in physical layer, data or higher links, or application layer. In some embodiments, the first device may determine whether a packet or packets include asynchronous data by checking protocol fields in physical layer, data or higher links, or application layer. Examples of asynchronous data can include asynchronous transfer mode (ATM) in data layer, and file transfer, email and the World Wide Web in application layer. In response to determining that a packet includes asynchronous data, the first device may query or ping a receiving device (e.g., a peripheral device) to determine whether the receiving device is "ready" to receive a transmission. In response to the receiving device sending a "ready" response, the first device may send the packet to the receiving device outside of a slot allotted (e.g., allocated, assigned) to the receiving device in the link servicing schedule (e.g., the first slot allotted to the first peripheral device 304(1) in the above example).

In some embodiments, the radio engine of the first device 302 may be configured to determine or identify at least one peripheral device 304 which is using an application which generates traffic asynchronously (e.g., not aligned to the slot of the respective peripheral device 304). The first device 302 may be configured to parse, inspect, or otherwise identify packets which are to be transmitted to the peripheral device 304 to determine whether the traffic was generated asynchronously. For example, some applications may generate visual data which is to be rendered on an HWD asynchronously, and such visual data may result in increased latency if the visual data is not timely transmitted to the HWD timely. The radio engine of the first device 302 may be configured to determine whether the peripheral device 304 corresponding to the asynchronous traffic is available to receive the asynchronous traffic (e.g., by transmitting a ping to the peripheral device 304 to determine whether the peripheral device 304 is awake or otherwise ready to receive data). If the peripheral device 304 is available to receive the asynchronous traffic, the radio engine of the first device 302 may be configured to override slotting of other peripheral devices 304 to automatically push, transmit, or otherwise provide the asynchronous traffic to the corresponding peripheral device 304.

Continuing the example shown in FIG. 3, the first device 302 may have a first link with the first peripheral device 304(1), a second link with the second peripheral device 304(2), and a third link with the n-th peripheral device 304(n). The link schedule followed by the first device 302 may include first servicing the first link, followed by the second link, followed by the third link (then returning back to servicing the first link). Where the radio engine of the first device 302 is currently servicing the first link, but receives asynchronous traffic for the third link, the radio engine of the first device 302 may be configured to switch from servicing the first link to the third link (e.g., to transmit the asynchronous data to the n-th peripheral device 304(n) via the third link). The radio engine of the first device 302 may then service the second link, followed by the third link again, then followed by the first link. As such, the radio engine of the first device 302 may be configured to dynamically switch between servicing links according to the link schedule when asynchronous data is received for transmission via one of the links. Additionally, because the first device 302 is utilizing the UWB device 308 to facilitate link transmissions, the first device 302 may skip/bypass/avoid performing a LBT function prior to transmitting the asynchronous data to the n-th peripheral device 304 via the third link. As such, the radio engine of the first device 302 may bypass delays that exist in the data path and can send asynchronous data (such as VR or video frames) via a corresponding link when the asynchronous data arrives at the first device 302.

Transmission Power Control for UWB Links Based on Traffic and Link Performance

In still another aspect, the present systems and methods are directed to transmission power control of data transmissions to a receiver. The systems and methods described herein may be configured to determine a traffic type of traffic to be sent to a receiver. The systems and methods described herein may be configured to control a power of the data transmissions based on the traffic type.

In some embodiments, the radio engine of the first device 302 and/or peripheral device 304 may optimize transmit power of packets exchanged between the first device 302 and peripheral device, based on traffic type. For instance, the radio engine of the first device 302 and peripheral device 304 may be configured to parse, inspect, determine, or otherwise identify a type of traffic being exchanged between the first device 302 and peripheral device 304, and a direction of the traffic (e.g., whether it is originating from the first device 302 or the peripheral device 304). The radio engine of the first device 302 and peripheral device 304 may be configured to optimize or control the power of traffic based on the traffic type and/or direction.

As one example, the first device 302 may be a controller of a HWD, and the peripheral device 304 may be the HWD (similar to the HWD 150 described above). The first device 302 may be configured to transmit one type of traffic (such as IMU traffic) to the peripheral device 304 (which may have a relatively lower/smaller payload). Additionally, the peripheral device 304 may be configured to transmit another type of traffic (such as map data traffic) to the first device 302, which may be a relatively higher/larger payload (e.g., 5 mb every 10 seconds, for example). The radio engine of the first device 302 and peripheral device 304 may be configured to modify, control, or optimize power of the data transmitted between the devices 302, 304 based on the payload size. For example, the radio engine of the first device 302 may be configured to increase the power (e.g., within a defined range of acceptable power) of the payload corresponding to IMU traffic transmitted to the peripheral device 304, which ensures/improves the reliability of the payload. Additionally, the radio engine of the peripheral device 304 may be configured to decrease the power (e.g., within the defined range of acceptable power) of the payload corresponding to larger payload traffic (such as map data), which reduces overall power consumption of the device (e.g., to within regulatory limits), as well as within an acceptable range of reliability of the payload. Such embodiments provides for dynamic selection/tuning of power based on traffic type.

In some embodiments, the radio engine of the first device 302 and/or peripheral device 304 may optimize the output power for traffic that includes multiple traffic types. For example, at a given time instance, the first device 302 may transmit multiple types of traffic to the peripheral device 304. The radio engine may determine the traffic types for all of the traffic to be sent from the first device 302 to the peripheral device 304 at the time instance. The radio engine may determine/control/adjust the combined payload size for all of the traffic. The radio engine may determine/control/adjust the output power for the combined payload size in a manner similar to selectively modifying the power based on payload as described above.

Figure 6:
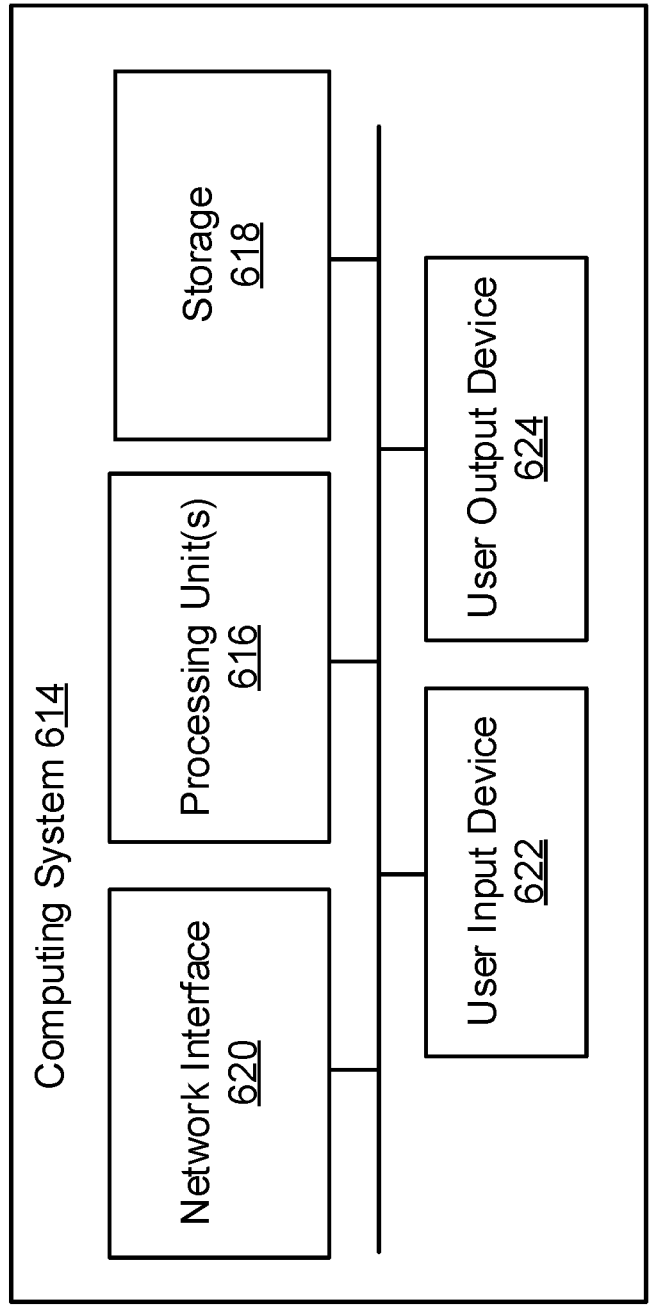
FIG. 6 is a block diagram of a computing environment according to an example implementation of the present disclosure.

Various operations described herein can be implemented on computer systems. FIG. 6 shows a block diagram of a representative computing system 614 usable to implement the present disclosure. In some embodiments, the computing device 110, the HWD 150, devices 302, 304, or each of the components of FIG. 1-5 are implemented by or may otherwise include one or more components of the computing system 614. Computing system 614 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 614 can be implemented to provide VR, AR, MR experience. In some embodiments, the computing system 614 can include conventional computer components such as processors 616, storage device 618, network interface 620, user input device 622, and user output device 624.

Network interface 620 can provide a connection to a wide area network (e.g., the Internet) to which WAN interface of a remote server system is also connected. Network interface 620 can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

User input device 622 can include any device (or devices) via which a user can provide signals to computing system 614; computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 624 can include any device via which computing system 614 can provide information to a user. For example, user output device 624 can include a display to display images generated by or delivered to computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 614 is illustrative and that variations and modifications are possible. Computer systems used in connection with the present disclosure can have other capabilities not specifically described here. Further, while computing system 614 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Transmission Control for UWB Links Based on Interference Conditions

Figure 7:
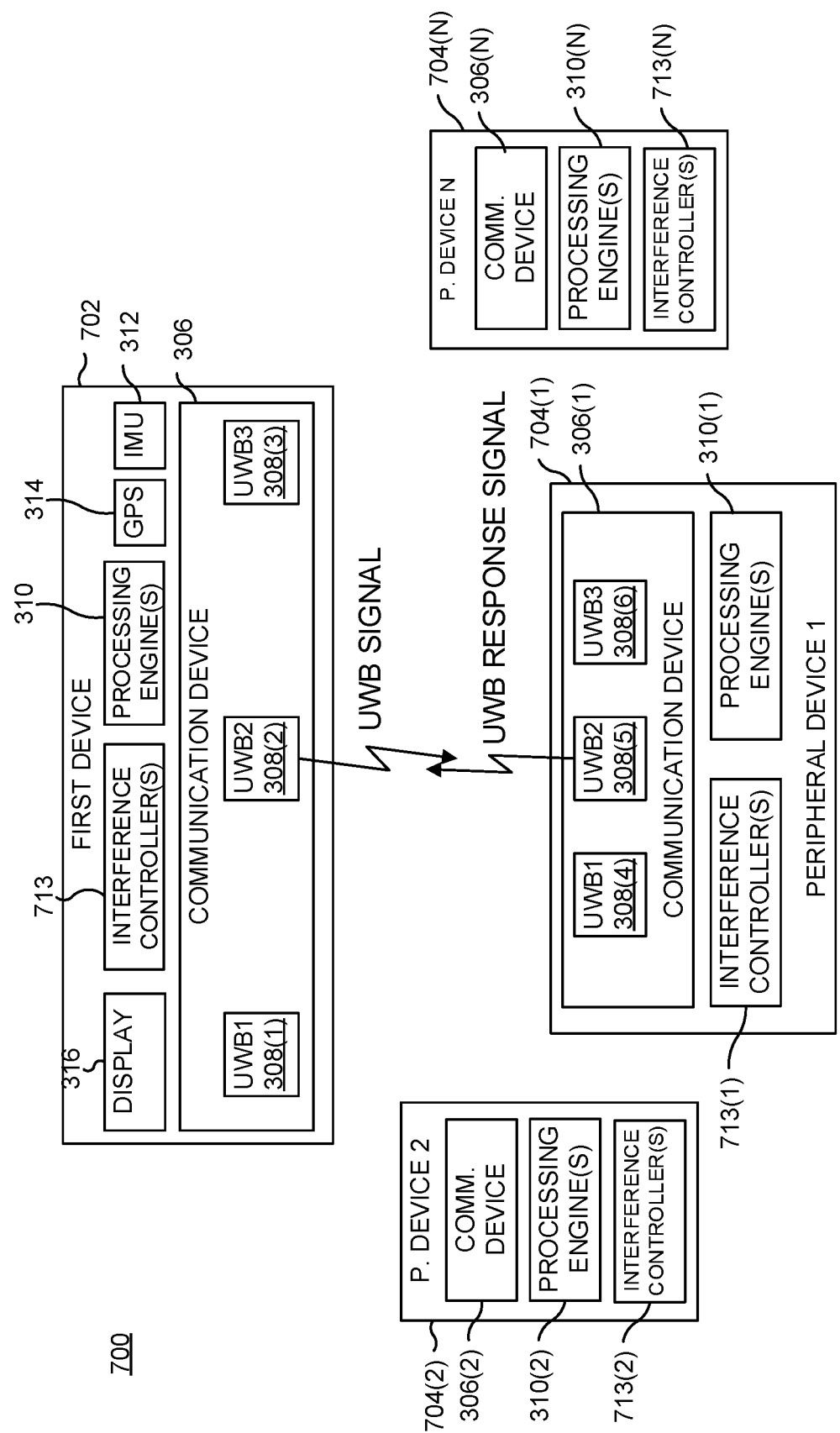
FIG. 7 is a block diagram of an environment subject to an interference condition, according to an example implementation of the present disclosure.

FIG. 7 is a block diagram of an environment 700 subject to an interference condition, according to an example implementation of the present disclosure.

Referring to FIG. 7, a first device 702 may include one or more ultra-wideband (UWB) antenna (e.g., UWB antennas 308(1)-308(3)) and one or more processors (e.g., processing unit 616 in FIG. 6). The first device may establish a plurality of respective connections with a plurality of second devices 704(1), 704(2), 704(N), each having a respective UWB antenna (e.g., UWB antennas 308(1)-308(3) of a second device 704(1)). In some embodiments, the first device 702 may be a primary device while the plurality of second devices may be peripheral devices. The first device 702 may have a configuration similar to the device 302 in FIG. 3 to FIG. 5 except that it may include one or more interference controllers 713. Similarly, the plurality of second devices 704 may have configurations similar to those of the plurality of peripheral devices 304 in FIG. 3 to FIG. 5 except that each of the second devices may include one or more interference controllers (e.g., a second device 704(1) may include one or more interference controllers 713(1)).

In some embodiments, the interference controller 713, 713(1), . . . , 713(N) may be or include any device, component, machine, or combination of hardware and software designed or implemented to control, schedule, transmit, receive, process, or otherwise manage data exchanged between devices 702, 704 in the environment 700. As described in greater detail below, the interference controller 713 may be configured to identify or detect an interference condition for connections between devices 702, 704. In some embodiments, the interference controller 713 may identify or detect actual interference or potential interference. Examples of the interference condition can include (1) co-existence or co-channel interference from Wi-Fi or Bluetooth or other UWB devices, (2) collisions (e.g., when two or more devices attempt to transmit data over a network at the same time), (3) channel conditions (e.g., channel degradation), (4) transmit power requirement (e.g., a device attempts to switch to lower transmit power), and the like.

In some embodiments, the interference controller 713 may identify (detect or obtain, or be informed of) an interference condition for at least one of the plurality of connections between the first device 702 and the plurality of second devices 704. The interference controller 713 may detect, on a frequency or channel for at least one of the plurality of connections, (1) interference on channel/connection, (2) transmission channel activity, and/or (3) signal energy. The interference controller 713 may identify or detect (1) interference by measuring or estimating metrics for channel condition(s) such as channel state information (CSI), a number of packets lost, a rate of packet errors, and the like. For example, CSI can be estimated at/by a receiver in a wireless interface (e.g., wireless interface 115A, 115B). A number of lost packets and/or a rate of packet errors can be measured by for instance sending a large number of probe messages (e.g., pings) to a destination device and counting or estimating a number of failed responses. The interference controller 713 may identify or detect (2) transmission channel activity by monitoring, listening or observing, on a particular channel or connection, channel activities such as a busy time for the particular channel or connection, a number of current beacons (e.g., IEEE 802.11 Beacon frames) on the particular channel or connection, or a number of unique beacons on the particular channel or connection (e.g., by ignoring repeated beacons). For example, such channel activities can be monitored or observed by setting a wireless interface in a monitoring mode or promiscuous mode. The interference controller 713 may identify or detect (3) signal energy by measuring or estimating signal energy metrics such as signal-to-noise ratio (SNR), received signal strength indicator (RSSI) and the like. For example, SNR and/or RSSI can be measured or estimated in a receiver in a wireless interface (e.g., wireless interface 115A, 115B).

In some embodiments, the interference controller 713 may be configured to select or determine one or more of a plurality of interference controls based on the detected interference condition, and can cause other component(s) (e.g., a radio engine of a processing engine 310) to perform the selected one or more interference controls. For example, the interference controller 713 may be configured to select or determine at least one interference control from among (1) transmission (TX) power control, (2) waveform control, (3) data processing control, and/or (4) frequency hopping, based on the detected interference condition. Such interference control of the interference controller 713 will be described in detail below with reference to FIG. 8.

Figure 8:
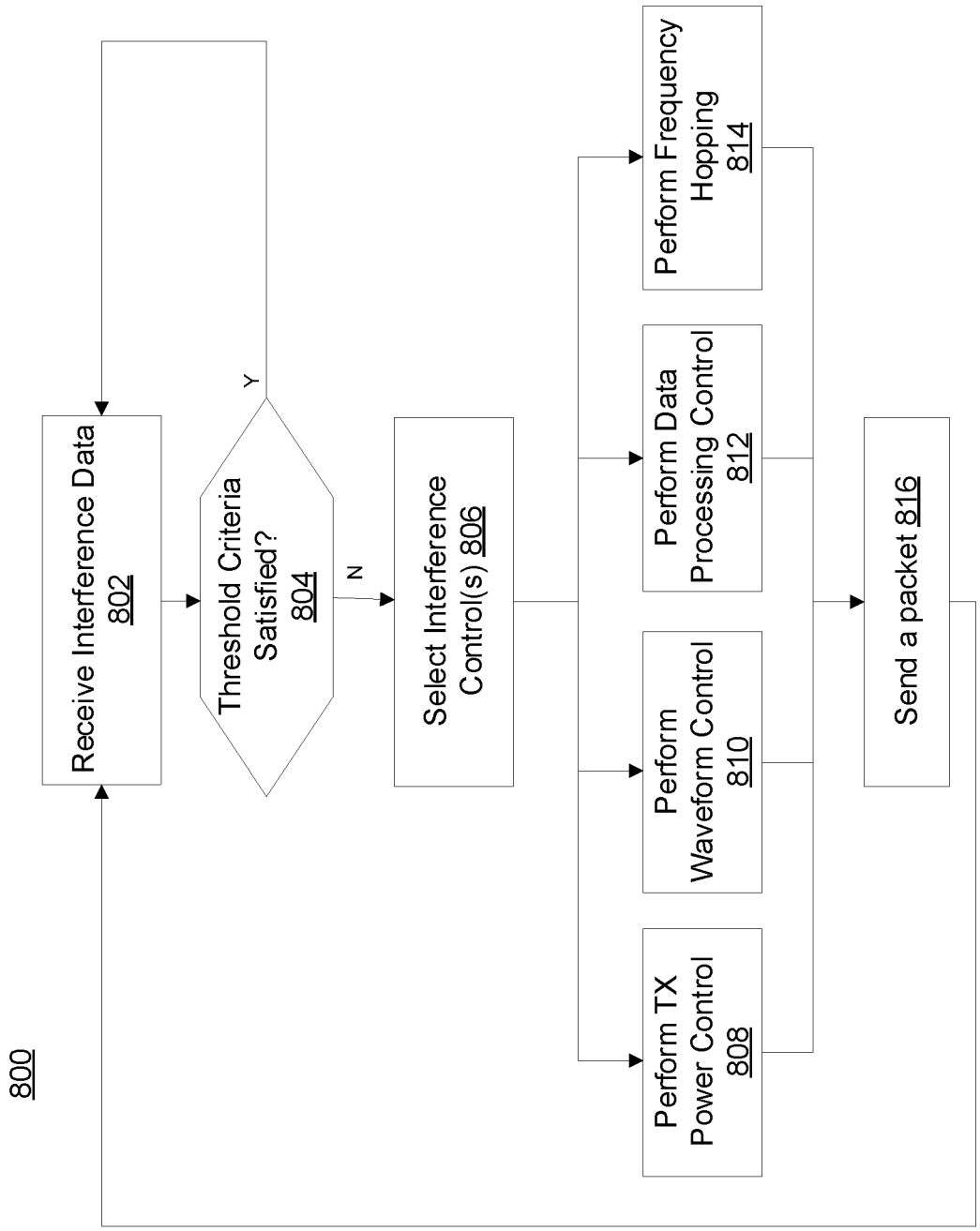
FIG. 8 is a flow chart illustrating a method for detecting an interference condition and performing UWB communications, according to another example implementation of the present disclosure.

FIG. 8 is a flow chart illustrating a method for detecting an interference condition and performing UWB communications, according to an example implementation of the present disclosure.

Referring now to FIG. 8, depicted is a flowchart showing an example method 800 of performing interference control, according to an illustrative embodiment. The method 800 may be performed by one or more of the devices 702, 704 for example described above with reference to FIG. 7. As a brief overview, at step 802, a device can receive interference data such as data relating to (1) interference on channel/connection, (2) transmission channel activity, and/or (3) signal energy. At step 804, the device determines whether a threshold criteria is satisfied/met. If yes, the method proceeds to step 802 where the device can continue to receive interference data. On the other hand, where a threshold criteria is not satisfied (which indicates some interference condition is identified or detected), the method can proceed to step 806 where the device selects one or more interference controls (or updates one or more configurations) based on the detected interference condition. At steps 808, 810, 812 and 814, the device can perform the selected interference control(s). After performing/adopting/implementing the interference control(s), at step 816 the device can send one or more packets. Following step 816, the method 800 may proceed back to step 804, and can loop between steps 802-816.

At step 802, a device (e.g., first device 702 in FIG. 7) may receive interference data such as an interference condition relating to (1) interference on channel/connection, (2) transmission channel activity, and/or (3) signal energy. In some embodiments, an interference controller 713 of one device may identify or detect, on a frequency or channel for at least one of the plurality of connections to other devices, an interference condition by measuring, estimating, monitoring or obtaining data relating to (1) interference on channel/connection (e.g., CSI, a number of packets lost, a rate of packet errors, etc.), (2) transmission channel activity (e.g., a busy time for the particular channel or connection, a number of current beacons on the particular channel or connection, or a number of unique beacons on the particular channel or connection, etc.) (3) signal energy (e.g., SNR, RSSI, etc.).

At step 804, the device may determine whether a threshold criteria is satisfied (indicating no interference condition) or not (indicating occurrence of interference condition). In some embodiments, an interference controller 713 of a device may set a threshold criteria for each category of interference data, for example, threshold values for each of CSI, a number of packets lost, a rate of packet errors, busy time duration/pattern/characteristics, number of current beacons, number of unique beacons, SNR, and/or RSSI. For example, if any of these threshold criteria is not satisfied, it may be determined that an interference condition occurs or exists on the least one connection of the plurality of connections to other devices. In response to determining that no interference condition exists (yes at step 804), the method can proceed to step 802 where the device can continue to receive interference data. On the other hand, in response to determining that a threshold criteria is not satisfied (which indicates some interference condition is identified or detected), the method can proceed to step 806.

At step 806, the device may select one or more interference controls (or updates one or more configurations) based on the detected interference condition. In some embodiments, an interference controller 713 of a device may determine or select one or more interference controls based on resources or capabilities of a radio engine of a processing engine 310. In other words, the interference controller may determine whether capabilities of the radio engine include (1) controlling or changing (e.g., increasing or decreasing) transmission (TX) strength, (2) changing the current waveform format to a simpler one, (3) changing the current data processing scheme to a more reliable/robust one, and/or (4) performing frequency hopping. In determining that the radio engine includes/support/has one or more control capabilities of controls (1) to (4), the interference controller may select one or more interference controls corresponding to the one or more control capabilities, and can cause the radio engine to perform the selected one or more interference controls. In some embodiments, the interference controller may refer to historical data relating to previously performed interference controls when a condition similar to the detected interference condition has previously occurred, and may then perform the same interference controls as the previously performed interference controls.

At steps 808, 810, 812 and 814, the device can perform/implement/adopt/activate the selected interference control(s). In some embodiments, the first device may update a configuration (e.g., configuration relating to radio or wireless transmission) for traffic sent via the at least one of the plurality of connections according to the selected one or more interference controls. In some embodiments, the interference controller 713 of the device may cause the radio engine of the processing engine 310 of that device to update a configuration by (1) controlling or changing (e.g., increasing or decreasing) transmission (TX) strength/intensity/power (step 808), (2) selecting a waveform format (step 810), (3) selecting a data processing scheme (step 812), or (4) performing frequency hopping (step 814).

At step 808, the device may perform a transmission (TX) power control. In some embodiments, a radio engine of the device may select a power transmission level for the traffic sent via (at least one of) the plurality of respective transmission responsive to the identified interference condition (e.g., poor channel condition, absence or scarcity of beacon transmissions, low SNR or RSSI, etc.). In some embodiments, the radio engine may perform a transmission power control (TPC) for UWB connections based on traffic and/or link performance to prevent unwanted interference between different wireless networks. For example, the radio engine may automatically reduce the used transmission output power when other network(s) are within a range such that reduced power can reduce interference and/or increase battery capacity.

In some embodiments, the radio engine or processing engine may determine a payload size for a packet, and may select a transmit power based on the payload size. For example, the radio engine may increase TX power or strength for smaller payloads, and can decrease TX power for larger payloads. In some embodiments, the radio engine may perform modulation of power based on packet size such that small packets can use larger power and large packets can use smaller power.

In some embodiments, the interference controller may identify (determine or detect) poor channel condition (which may require higher transmit power to overcome the loss) as an interference condition and can cause the radio engine to reduce a packet size limit, thereby enabling lower average throughput. In response to determining that channel conditions have improved, the radio engine may allow for (or relax to) a lower power level and may allow the packet size limit to be increased, thereby enabling higher average throughput.

At step 810, the device may perform a waveform control. In some embodiments, the radio engine may select a waveform format for the traffic sent via the plurality of respective transmission responsive to the identified interference condition (e.g., poor channel condition, absence or scarcity of beacon transmissions, low SNR or RSSI, etc.). The radio engine may relax the waveform to simpler ones when it attempts to switch to lower transmit power. For example, the radio engine can lower spreading of the waveform, or move to simpler non-coherent schemes like On-off keying (OOK) etc. which can achieve lower power consumption while being likely more prone to interference.

In some embodiments, the radio engine or processing engine may determine a traffic type of data included in the packet. The first device may select the at least one of the power transmission level or the waveform format according to the traffic type and the identified interference condition. For example, the radio engine of a device may be configured to optimize or control the power of traffic based on the traffic type and/or direction.

At step 812, the device may perform a data processing control. In some embodiments, responsive to the identified interference condition, the interference controller of a device may cause a radio engine or processing engine to update the configuration relating to data processing of a packet or frame to be transmitted. In some embodiments, the radio engine or processing engine may select a data processing scheme based on the identified interference condition (e.g., poor channel condition, absence or scarcity of beacon transmissions, low SNR or RSSI, etc.), and can generate the packet or frame according to the data processing scheme. For example, the radio engine or processing engine may select a data processing scheme based on a likelihood of interference. Examples of the data processing scheme include selection of a packet size, a coding scheme (e.g., encoding or decoding), sequencing scheme, and the like.

In some embodiments, the radio engine or processing engine may select a data processing scheme corresponding to a packet size for the packet, responsive to the identified interference condition. Different data processing schemes may result in packets having different amounts of data, different amounts of packet processing involved, etc. For example, when the radio engine or processing engine attempts to increase TX power or strength in response to an interference condition, it may select a smaller packet size to increase TX power or strength for smaller payloads. On the other hand, when the radio engine or processing engine attempts to decrease TX power or strength in response to no interference condition, it may select a larger packet size to decrease TX power or strength for larger payloads. In some embodiments, the radio engine or processing engine of a device may further select the data processing scheme from a first data processing scheme and a second data processing scheme. The first data processing scheme may cause the device to generate packets having a first data size and the second data processing scheme may cause the device to generate packets having a second data size smaller than the first data size.

In some embodiments, the first radio engine or processing engine may encode the packet according to a data processing scheme. For example, a more reliable encoding scheme (e.g., longer coding and/or longer sequences, repeated data transmission with a different or random symbol, or use of error correcting code) can be performed when interference is likely. Data processing scheme(s) used when interference is likely may result in more power consumption, but is less susceptible to interference.

At step 814, the device may perform frequency hopping. In some embodiments, the radio engine of a device may perform a frequency hop according to an identified or detected interference condition (e.g., poor channel condition, absence or scarcity of beacon transmissions, low SNR or RSSI, etc.). For example, the radio engine can adaptively perform a frequency hop to avoid interference with other WiFi and/or UWB links.

In some embodiments, the radio engine of one device may identify, for a first connection of the plurality of connections to another device, one or more metrics for the first connection, and can determine to switch from a first frequency for the first connection to a second frequency for the first connection responsive to the one or more metrics satisfying a threshold criteria. In some embodiments, the one or more metrics may include a number of packets lost, a rate of packet errors, a busy time for the first connection, a number of current beacons on the first connection, or a number of unique beacons on the first connection. For example, when a device uses 3-5 GHz where the UWB spectrum is between 3.1 GHz and 10.6 GHz, the radio engine of the device may monitor or observe a busy time and/or a number of current beacons on the current channel, and may determine that communications are to be transmitted/received on both the 2.4 GHz wireless link and UWB wireless link. In response to the determination, the radio engine may be configured to switch from 3-5 GHz to a higher frequency (e.g., between 5-10 GHz, for example) within the UWB spectrum.

In some embodiments, the radio engine may automatically switch between (UWB) link frequencies. The radio engine may select another frequency or channel other than the current frequency or channel based on a detected interference condition, e.g., interference, transmission channel activity, and/or signal energy. The radio engine may automatically switch between frequencies based on changes in detected interference/energy/activity on a current frequency or channel.

For example, referring to FIG. 7, a first device 702 and peripheral devices 704 may be configured to automatically switch between frequencies. An interference controller may be configured to detect an interference on a current frequency in which signals are transmitted, received, or otherwise exchanged between the first device 702 and peripheral device 704. The interference controller may be configured to detect the interference based on channel and/or packet statistics (e.g., packet loss or packet error rate, busy/occupied time of a channel, current beacons on a channel, unique beacon count on a channel, etc.) for one or more channels between the first device 702 and peripheral device 704. The interference controller may be configured to compare the channel and/or packet statistics to a predetermined threshold. The interference controller may be configured to automatically trigger a frequency change (e.g., from a first or current frequency to a new frequency) when the channel and/or packet statistics of the current frequency do not satisfy a predetermined threshold (e.g., packet loss/error rate exceed a predetermined threshold, busy time of a channel exceeds a predetermined threshold, number of current beacons on a channel exceed a predetermined threshold, unique beacon count exceeds a predetermined threshold, etc.). In some embodiments, the interference controller can trigger a frequency change or hopping by causing the radio engine or processing engine to switch from the first or current frequency to the new frequency. In this manner, an artificial reality or other wireless communication environment (e.g., environment 700) may enable automatic and/or dynamic switching (or hop) between different frequencies/channels based on a detected, identified, or otherwise determined interference between the first device 702 and peripheral device 704, to avoid interference with other communication links.

In some embodiments, communications between the first device 702 and the peripheral device 704 may proceed according to a channel/frequency hopping schedule (e.g., pattern or sequence) that is established and/or updated according to the detection of interference/energy/activity in one or more channels/frequencies. In some embodiments, the radio engine(s) of the first device 702 and/or peripheral device 704 operating on a first channel/frequency may switch to a second channel/frequency to measure interference or otherwise collect channel statistics. The first device 702 and/or peripheral device 704 may store the measured interference and/or channel statistics for selectively switching from the first channel/frequency to the second channel/frequency responsive to the channel and/or packet statistics of the first channel/frequency not satisfying the predetermined threshold.

Referring back to FIG. 8, after performing the interference controls (steps 808 to 814), at step 816, the device may send one or more packets. In some embodiments, with updated (transmission) configuration(s) as a result of performing one or more selected interference controls (steps 808 to 814), a first device (or radio engine and/or communication device 306 thereof) may transmit at least one packet to one of the plurality of second devices according to the updated configuration(s). For example, the first device may transmit the packet using (1) a selected power transmission level, (2) a selected waveform format, (3) a selected packet or payload size, and/or (4) a selected new frequency.

Following step 816, the method 800 may proceed back to step 804, and can loop between steps 802-816.

Figure 9:
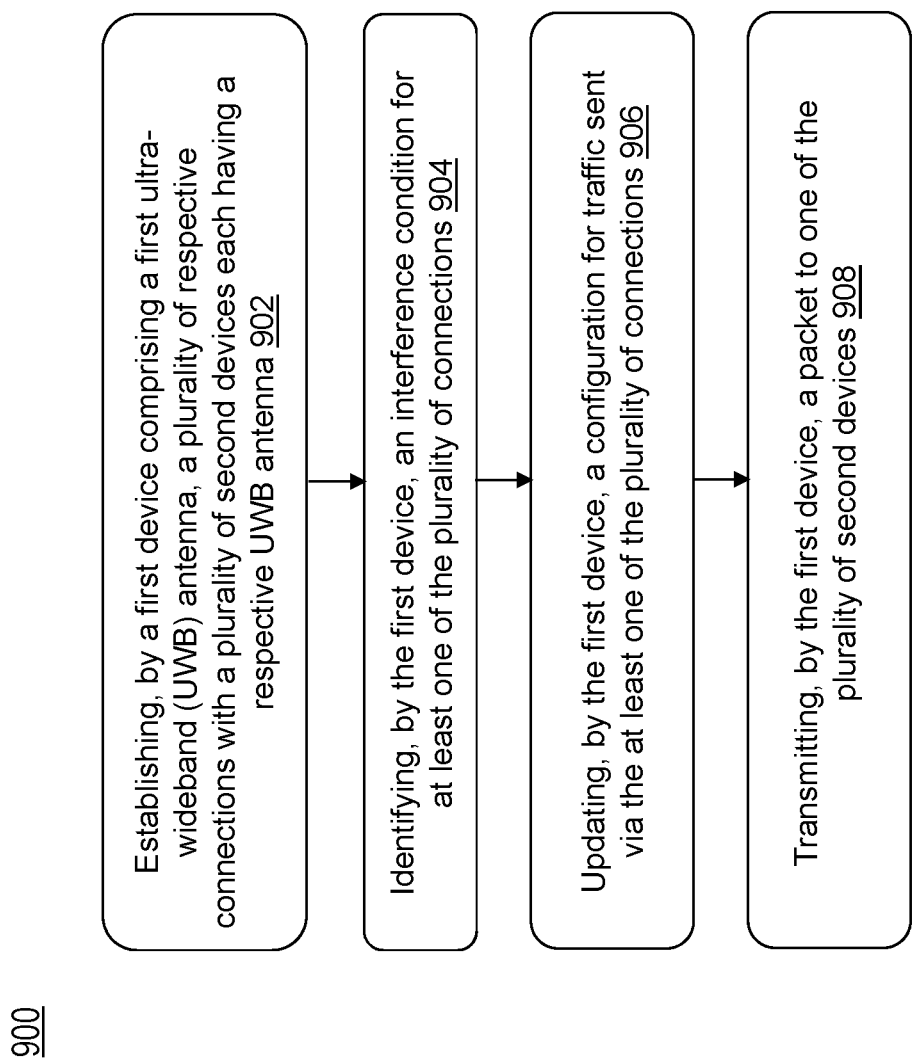
FIG. 9 is a flow chart illustrating a method for performing UWB communications, according to another example implementation of the present disclosure.

FIG. 9 is a flowchart showing an example method 900 of performing UWB communications, according to an example implementation of the present disclosure. In some embodiments, the method 900 may be performed by one or more of the devices 302, 304, 702, 704 described above with reference to FIG. 3-FIG. 8. In some embodiments, the process 900 is performed by other entities (e.g., Console 110, HWD 105 in FIG. 1). In some embodiments, the process 900 includes more, fewer, or different steps than shown in FIG. 9.

As a brief overview, at step 902, a device establishes a connection. At step 904, the device may identify an interference condition. At step 906, the device may update a configuration based on the interference condition. At step 908, the device can transmit a packet according to the updated configuration.

At step 902, a first device (e.g., device 702 in FIG. 7) may establish a plurality of respective connections with a plurality of second devices (e.g., devices 704 in FIG. 7) each having a respective UWB antenna.

At step 904, the first device may identify or detect an interference condition (e.g., poor channel condition, absence or scarcity of beacon transmissions, low SNR or RSSI, etc.) for at least one of the plurality of connections. In some embodiments, the first device (e.g., interference controller or radio engine of the device) may be configured to select at least one of a power transmission level (e.g., increased TX power level) or a waveform format (e.g., simpler waveform) for the traffic sent via at least one of the plurality of respective transmission, responsive to the identified interference condition.

In some embodiments, the first device may identify, for a first connection of the plurality of connections, one or more metrics for the first connection (e.g., metrics relating to (1) interference on channel/connection, (2) transmission channel activity, and/or (3) signal energy), and can determine to switch from a first frequency for the first connection to a second frequency for the first connection responsive to the one or more metrics satisfying a threshold criteria. In some embodiments, the one or more metrics may include a number of packets lost, a rate of packet errors, a busy time for the first connection, a number of current beacons on the first connection, or a number of unique beacons on the first connection. For example, responsive to an interference condition identified based on such metrics, the radio engine of the first device may switch from the current frequency for the first connection to a new frequency at which the interference condition can be eliminated or reduced.

At step 906, the first device may update a configuration (e.g., updated configuration(s) as a result of performing one or more selected interference controls as shown in steps 808 to 814 in FIG. 8) for traffic sent via the at least one of the plurality of connections according to the identified interference condition.

At step 908, the first device may transmit a first packet to one of the plurality of second devices according to the updated configuration. In some embodiments, the first device may be configured to transmit the first packet using the selected power transmission level or the selected waveform format. For example, the first device may transmit the packet using (1) a selected power transmission level, (2) a selected waveform format, (3) a selected packet or payload size, and/or (4) a selected new frequency. The first device may be configured to determine a traffic type of data included in the packet. The first device may be configured to select the at least one of the power transmission level or the waveform format according to the traffic type and/or the identified interference condition. For example, the radio engine of the first device may be configured to optimize or control the power of traffic or the waveform format based on the traffic type of data included in the packet and/or a direction of the packet.

In some embodiments, to update the configuration, the first device may be configured to select a data processing scheme corresponding to a packet size for the first packet, responsive to the identified interference condition, and can generate the packet according to the data processing scheme. The first device may be further configured to encode the packet according to the data processing scheme. The first device may be further configured to select the data processing scheme from a first data processing scheme and a second data processing scheme. The first data processing scheme may cause the first device to generate packets having a first data size and the second data processing scheme may cause the first device to generate packets having a second data size.

In some embodiments, the plurality of second devices (e.g., devices 704 in FIG. 7) may include a second device (e.g., device 704(1) in FIG. 7) and a third device (e.g., device 704(2) in FIG. 7). The first device (e.g., device 702 in FIG. 7) may be further configured to generate a link servicing schedule for the plurality of second devices. The link servicing schedule may include/define//specify a first slot for exchanging first data with the second device 704(1) and a second slot for exchanging second data with the third device 704(2). In some embodiments, the first device may be configured to receive a second packet for transmission to the second device 704(1) outside of the first slot, may determine that the second packet includes asynchronous data and may transmit the second packet to the second device outside of the first slot. In some embodiments, the first device may determine whether a packet or packets include asynchronous data by checking protocol fields in physical layer, data or higher links, or application layer. In response to determining that a packet includes asynchronous data, the first device 702 may query or ping the second device 704(1) to determine whether the receiving device is "ready" to receive a transmission. In response to the receiving device sending a "ready" response, the first device 702 may send the packet to the second device 704(1) outside of a slot allotted to the second device 704(1) in the link servicing schedule.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   establishing, by a first device comprising a first ultra-wideband (UWB) antenna, a plurality of respective connections with a plurality of second devices each having a respective UWB antenna;
   identifying, by the first device, an interference condition for at least one of the plurality of connections;
   updating, by the first device, a configuration for traffic sent via the at least one of the plurality of connections according to the identified interference condition; and
   transmitting, by the first device, a packet to one of the plurality of second devices according to the updated configuration,
   wherein updating the configuration comprises:
   selecting, by the first device, a waveform format for the traffic sent via the at least one of the plurality of connection responsive to the identified interference condition.

2. The method of claim 1, wherein
   transmitting the first packet comprises transmitting, by the first device, the first packet using the selected waveform format.

3. The method of claim 2, further comprising:
   determining, by the first device, a traffic type of data included in the packet,
   wherein selecting the waveform format comprises selecting, by the first device, the waveform format according to the traffic type and the identified interference condition.

4. The method of claim 1, wherein updating the configuration comprises:
   selecting, by the first device, a data processing scheme corresponding to a packet size for the packet, responsive to the identified interference condition; and
   generating, by the first device, the packet according to the data processing scheme.

5. The method of claim 4, wherein generating the packet further comprises encoding, by the first device, the packet according to the data processing scheme.

6. The method of claim 4, wherein selecting the data processing scheme comprises selecting, by the first device, the data processing scheme from a first data processing scheme and a second data processing scheme, wherein the first data processing scheme causes the first device to generate packets having a first data size and the second data processing scheme causes the first device to generate packets having a second data size.

7. The method of claim 1, wherein the plurality of second devices comprises a second device and a third device, the method further comprising:
   generating, by the first device, a link servicing schedule for the plurality of second devices, the link servicing schedule comprising a first slot for exchanging first data with the second device and a second slot for exchanging second data with the third device.

8. The method of claim 7, further comprising:
   receiving, by the first device, a second packet for transmission to the second device outside of the first slot;
   determining, by the first device, that the second packet includes asynchronous data; and
   transmitting, by the first device, the second packet to the second device outside of the first slot.

9. The method of claim 1, further comprising:
   identifying, by the first device, for a first connection of the plurality of connections, one or more metrics for the first connection; and
   determining, by the first device, to switch from a first frequency for the first connection to a second frequency for the first connection responsive to the one or more metrics satisfying a threshold criteria.

10. The method of claim 9, wherein the one or more metrics comprise a number of packets lost, a rate of packet errors, a busy time for the first connection, a number of current beacons on the first connection, or a number of unique beacons on the first connection.

11. A device comprising:
a first ultra-wideband (UWB) antenna; and
one or more processors configured to:
- establish a plurality of respective connections with a plurality of second devices each having a respective UWB antenna;
- identify an interference condition for at least one of the plurality of connections;
- update a configuration for traffic sent via the at least one of the plurality of connections according to the identified interference condition by selecting a waveform format for the traffic sent via the at least one of the plurality of connections responsive to the identified interference condition; and
- transmit a first packet to one of the plurality of second devices according to the updated configuration.

12. The device of claim 11, wherein the one or more processors are configured to transmit the first packet using the selected waveform format.

13. The device of claim 12, wherein the one or more processors are configured to determine a traffic type of data included in the packet, wherein the one or more processors are configured to select the waveform format according to the traffic type and the identified interference condition.

14. The device of claim 11, wherein to update the configuration, the one or more processors are configured to:
- select a data processing scheme corresponding to a packet size for the packet, responsive to the identified interference condition; and
- generate the packet according to the data processing scheme.

15. The device of claim 14, wherein the one or more processors are further configured to encode the packet according to the data processing scheme.

16. The device of claim 14, wherein the one or more processors are further configured to select the data processing scheme from a first data processing scheme and a second data processing scheme, wherein the first data processing scheme causes the first device to generate packets having a first data size and the second data processing scheme causes the first device to generate packets having a second data size.

17. The device of claim 11, wherein the plurality of second devices comprises a second device and a third device, wherein the one or more processors are further configured to
- generate a link servicing schedule for the plurality of second devices, the link servicing schedule comprising a first slot for exchanging first data with the second device and a second slot for exchanging second data with the third device;
- receive a second packet for transmission to the second device outside of the first slot;
- determine that the second packet includes asynchronous data; and
- transmit the second packet to the second device outside of the first slot.

18. The device of claim 11, wherein the one or more processors are further configured to:
- identify, for a first connection of the plurality of connections, one or more metrics for the first connection; and
- determine to switch from a first frequency for the first connection to a second frequency for the first connection responsive to the one or more metrics satisfying a threshold criteria.

19. The device of claim 18, wherein the one or more metrics comprise a number of packets lost, a rate of packet errors, a busy time for the first connection, a number of current beacons on the first connection, or a number of unique beacons on the first connection.

20. A non-transitory computer readable medium storing instructions that, when executed by one or more processors, cause the one or more processors to:
- establish a plurality of respective connections between a first device comprising a first ultra-wideband (UWB) antenna and a plurality of second devices each having a respective UWB antenna;
- identify an interference condition for at least one of the plurality of connections;
- update a configuration for traffic sent via the at least one of the plurality of connections according to the identified interference condition by selecting a waveform format for the traffic sent via the at least one of the plurality of connections responsive to the identified interference condition; and
- transmit a first packet to one of the plurality of second devices according to the updated configuration.

* * * * *